Feb. 13, 1962  J. J. BOCCHINO  3,020,978
CHAIN LUBRICATOR DEVICE
Filed July 24, 1958
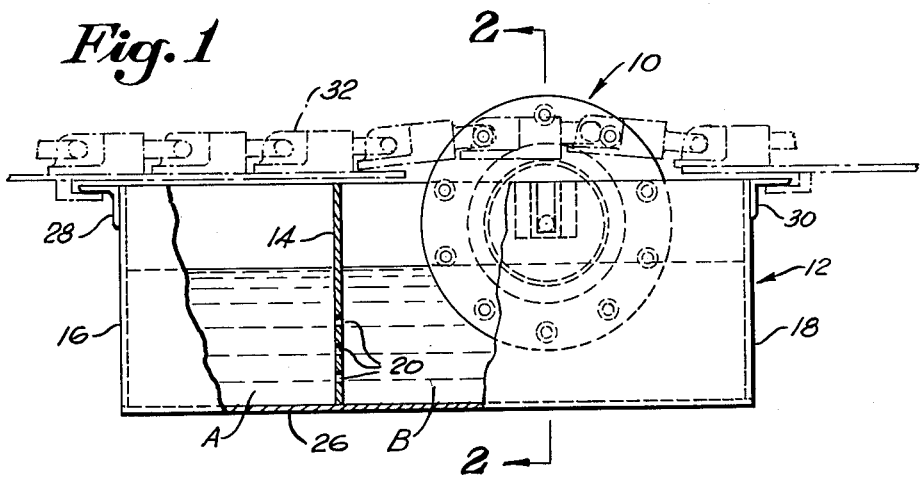
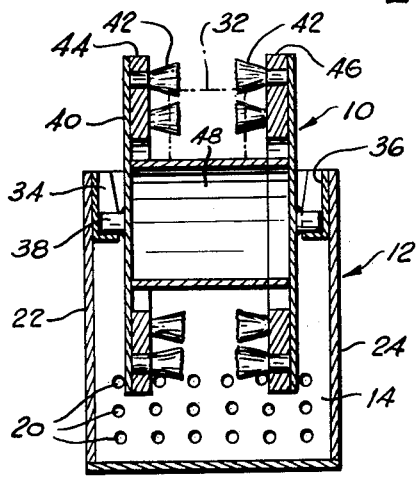
INVENTOR.
Joseph J. Bocchino
BY Richards & Geier
ATTORNEYS 3,020,978
CHAIN LUBRICATOR DEVICE
Joseph J. Bocchino, Rockaway, N.J., assignor to Bell Fabricating Co. Inc., Paterson, N.J., a corporation of New Jersey
Filed July 24, 1958, Ser. No. 750,694
1 Claim. (Cl. 184—17)

This invention relates to a chain lubricator apparatus, and refers more particularly to improvements in a chain lubricator apparatus for conveyor equipment.

My co-pending patent application, Serial No. 682,353, filed September 6, 1957, now Patent No. 2,893,516, describes a trough and chain lubricator unit used for cleaning conveyor and chain equipment.

The present invention concerns itself with improvements made particularly in the trough of the chain lubricator unit described in the above-mentioned patent application, and an object of the present invention is to improve and modify the construction thereof.

Furthermore, of the many disadvantages experienced by the prior art constructions, one of the most salient features has been the lack of appropriate reservoir-like means for maintaining a constant supply of cleaning material which may be readily transferred gravitationally from one location to another location.

As the conveyor and other similar chains are passed through the chain lubricator device, the supply of cleaning solution in the trough is gradually depleted. Within a relatively short period of time the supply is exhausted and must be constantly replenished during the course of operation. Therefore, practical experience has shown that the cleaning material supply would be more effectively handled and constant refilling eliminated if a trough were devised in such a manner so as to require minimum attention.

It is an object therefore of the present invention to provide an improved trough for a chain lubricator unit, whereby a plurality of cleaning solutions of varying consistency may be conveniently used.

Another object of the present invention is to provide means for maintaining a constant supply of cleaning material to an adjacent compartment during a greater period of time of operation.

Still another object is to provide means for gravitationally transferring the cleaning material from one compartment to another compartment effortlessly.

Yet another object is to provide a more self-functioning chain lubricator unit, and which does not require the constant attention of an operator.

An additional object is to overcome the disadvantages of prior art constructions and to provide an improved unit not heretofore disclosed.

Other objects will become apparent during the course of the following specification.

In the attainment of the aforesaid and other objectives, the inventive concept of the present invention may be realized through the provision of a trough which may be constituted essentially of two compartments adapted to serve as a reservoir-like supply means as well as an immersion bath for the chain lubricator unit, respectively. The improved trough of the present invention may be provided with means for holding a plurality of cleaning or lubricating materials used with the chain lubricator unit 10 described in my patent application, Serial No. 682,353, filed September 6, 1957.

A partition plate is provided intermediate the ends of the trough and is formed with a plurality of holes so as to allow the cleaning and lubricating material to pass freely therethrough. Naturally, the size of the holes and position of the partition plate is dependent upon the requirements of the manufacturer and the conditions prevailing at the time of operation.

Due to the provision of this partition plate, the trough and supply means may be considerably simplified and its operation improved to a substantial extent.

A fuller understanding of the present invention may be had by referring to the following description taken in conjunction with the accompanying drawing showing, by way of example, a preferred embodiment of the inventive idea.

In the drawing:

FIGURE 1 is a longitudinal view of the improved trough and chain lubricator apparatus, showing some parts in section.

FIGURE 2 is a transverse section of the improved trough and chain lubricator unit as shown in FIGURE 1 taken along the line 2—2 thereof.

Referring now to the drawing in greater detail, wherein like reference numerals indicate like parts, reference numeral 10 indicates a chain lubricator apparatus, and reference numeral 12 indicates an improved trough of the present invention.

The chain lubricator unit 10 as described in my patent application, Serial No. 682,353, filed September 6, 1957, is essentially a rotatable unit comprised of two circular bristle-bearing discs predeterminedly separated from each other by a cylinder member mounted coaxially on another smaller axle which is rotatably suspended in a trough from suitable supports disposed along the inner surfaces thereof.

The inventive concept of the present invention may also be realized through the provision of other removable partition plates provided with a plurality of holes of varying sizes.

In the preferred embodiment of the present invention, the trough 12 has a partition plate 14 disposed intermediate the ends 16 and 18 at a predetermined distance from each other.

The partition plate 14 is provided with a plurality of holes 20 disposed along the lowermost half portion of the plate.

The plate 14 may be permanently secured along the sides 22, 24 and bottom 26 by welding or any other well-known manner. If desired, a removable plate may be positioned in the trough by providing two channels or grooves in the sides 22 and 24 as well as in the bottom portion 26 of the trough 12. The interchangeable feature of the partition plate therefore would be desired whenever cleaning and lubricating materials of varying consistency are used.

Two compartments, namely, a soap compartment A and a brush compartment B are formed by partitioning the trough 12.

The soap compartment A serves as a supply depot containing an appropriate cleaning or lubricating of known consistency. The brush compartment B serves as an immersion bath for dunking the lowermost half portions of the rotatable brush-bearing discs of the chain lubricator.

The trough 12 is provided with two sleeve-retaining brackets 28 and 30 disposed on ends 16 and 18, respectively, to removably hold the trough 12 in a convenient and appropriate manner underneath the underlying surfaces of the conveyor chain 32.

Axle-retaining brackets 34 and 36 are provided along the inner wall surfaces of sides 22 and 24, respectively, for rotatably holding the ends of axle 38 and lowermost portion of the chain lubricator unit 40 in a submerged position in the immersion bath of the brush compartment B.

The lubricator unit 40 is comprised essentially of a plurality of bristles 42 disposed along the inner surfaces of discs 44 and 46.

A cylindrical member 48 separates discs 44 and 46 from each other at a predetermined distance and is coaxially mounted on an axle 38 which has its ends rotatably disposed in brackets 34 and 36 of trough 12.

In operation, the soap compartment A is filled with a supply of cleaning or lubricating material of known consistency. The brush compartment B is filled with water or other liquid medium. The cleaning or lubricating material is of such consistency so that it will gradually flow through the holes 20 disposed in the partition plate 14 and will become mixed with the aqueous medium in the brush compartment B as the chain lubricator unit 40 revolves in the trough 12.

As the conveyor or chain passes over the cylindrical member 48 between the rotating discs 44 and 46, the bristles 42 containing a fresh supply of soap material clean or lubricate the conveyor chain. Supplying aqueous medium in the brush compartment is readily carried out as needed, and generally is done at the time of recharging the soap compartment A.

It thus will be seen that there is provided an improved device herein which achieves the several objects of the present invention aforesaid and is well adapted to meet the conditions of practical and novel use.

Numerous advantages are evident in the device of the present invention. Some of the most salient features are as follows:

Constant refilling of trough 12 is eliminated since only an initial recharging of the soap compartment A at the beginning of a run is sufficient to last during the entire period of an eight-hour operation.

A plurality of cleaning or lubricating materials of varying consistencies may be used freely and interchangeably dependent upon the requirements of the manufacturer and the conditions prevailing at the time of operation. Likewise, the increased interchangeability and adaptability features of the improved unit of the present invention enable it to be more readily controlled and operated which heretofore has not been possible with previous constructions.

Another important advantage is the economy resulting with negligible replacement, maintenance and production costs.

It will be understood that the present invention is not limited to the specific embodiment hereinabove described but includes all such modifications, variations and equivalents as fall within the scope of the appended claims.

What is claimed is:

In combination with a horizontally extending chain having a plurality of pivotally interconnected links and a lubricator unit having two discs, a cylinder supporting said discs in spaced alined relationship, a plurality of spaced bunches of bristles circumferentially carried by said discs, the bristles upon one disc facing the bristles upon the other disc and being spaced therefrom a distance which is less than the width of said chain, said cylinder having a surface supporting said chain and extending between said discs, said bristles being located at a distance from said surface which is less than the height of said chain, and an axle centrally supporting said cylinder; a lubricating device comprising a trough having two parallel elongated side walls, parallel shorter end walls interconnecting said side walls, and a bottom connected with said side walls and said end walls, said trough having an open top, said side and end walls being of equal height; a partition located within said trough and connected to said end walls and said bottom, said partition extending parallel to said end walls substantially closer to one end wall than the other end wall to separate the interior of said trough into a smaller soap compartment and a larger lubricator compartment, two brackets carried by said side walls within said lubricator compartment and supporting said axle at a height from said bottom at which a portion of said surface of the cylinder projects above said trough and at which said discs are spaced from said bottom, and two brackets carried by said end walls and located substantially opposite each other, the last-mentioned brackets having chain-supporting surfaces extending away from said end walls in alinement with the top of said trough, said partition having a plurality of openings located in parallel rows at different levels between said bottom and said lubricator unit, at least the uppermost row of said openings being located at a level which is greater than the distance between said bottom and said discs.

References Cited in the file of this patent

UNITED STATES PATENTS

| | | |
|---|---|---|
| 411,854 | Carter | Oct. 1, 1889 |
| 1,140,475 | Mulholland | May 25, 1915 |
| 2,311,862 | Palmquist | Feb. 23, 1943 |
| 2,570,375 | Pritchard | Oct. 9, 1951 |
| 2,720,941 | Carson | Oct. 18, 1955 |
| 2,812,150 | Winterhoff | Nov. 5, 1957 |
| 2,893,516 | Bocchino | July 7, 1959 |